United States Patent [19]
Knobloch et al.

[11] 3,873,613
[45] Mar. 25, 1975

[54] ISOLATION OF TETRACHLOROTEREPHTHALIC ACID

[75] Inventors: James O. Knobloch, Naperville; James E. Latta, Hinsdale, both of Ill.

[73] Assignee: Standard Oil Company, Chicago, Ill.

[22] Filed: Sept. 20, 1973

[21] Appl. No.: 399,125

[52] U.S. Cl. .............................. 260/525, 260/515 A
[51] Int. Cl. ...................... C07c 63/26, C07c 51/42
[58] Field of Search ............. 260/525, 524 S, 515 A

[56] References Cited
UNITED STATES PATENTS
1,997,226  4/1935  Mueller ......................... 260/515 A FOREIGN PATENTS OR APPLICATIONS
44-2,455  2/1969  Japan ................................. 260/525

Primary Examiner—Lorraine A. Weinberger
Assistant Examiner—Richard D. Kelly
Attorney, Agent, or Firm—William H. Magidson; Arthur G. Gilkes; William T. McClain

[57] ABSTRACT

Method of isolating relatively pure tetrachloroterephthalic acid from a spent oleum chlorination mother liquor which comprises the steps of eliminating substantially all sulfur trioxide and chlorosulfonic acid from said mother liquor and partitioning tetrachloroterephthalic acid from the mother liquor.

10 Claims, No Drawings

ISOLATION OF TETRACHLOROTEREPHTHALIC ACID

This invention relates to improved methods of producing and isolating tetrachloroterephthalic acid.

The recent growth in the use of flammable materials has increased the incidences of damage and personal injury by fire. Concern for public safety has prompted government agencies to impose stricter flammability standards for those applications where synthetic materials are used. As a result, the use of halogen-containing compounds, particularly chlorine and bromine-containing compounds as additives or as integral parts of a finished polymer to impart fire-retardant properties to polymeric materials is a rapidly growing industry of great commercial importance. Such compositions can be utilized in those areas of application where fire is likely to occur and to prevent substantial danger or hazard to individuals or property.

German Pat. No. 1,078,563, which is incorporated by reference, discloses that tetrachloroterephthalic acid can be obtained in good yields by reacting terephthalic acid with chlorine in oleum (fuming sulfuric acid) using iodine as a catalyst. For each mol of chlorine consumed in this reaction, one mol of sulfur trioxide is converted to one mol chlorosulfonic acid. Although tetrachloroterephthalic acid can be recovered from the reaction medium by simple partitioning (filtration or centrifugation), the reaction medium contains substantial quantities of dissolved tetrachloroterephthalic acid in the filtrate or solution. Typically 15 to 50% by weight of the tetrachloroterephthalic acid produced in the reaction is present in the solution together with substantial quantities of partially chlorinated terephthalic acids, such as monochloroterephthalic acid, dichloroterephthalic acid, etc. Accordingly, it is economically desirable to recover the dissolved tetrachloroterephthalic acid from the reaction medium and to convert the mono- and dichloroterephthalic acids to the desired tetrachloroterephthalic acid.

Initially, we felt that there was sufficient tetrachloroterephthalic acid and partially chlorinated terephthalic acids remaining in the reaction medium (spent oleum) to make it practical to fortify the spent oleum with fresh sulfur trioxide and use this composition as the reaction medium for the chlorination of additional terephthalic acid. Unfortunately, we found that as additional undesirable by-products (tetrachlorobenzoic acid, pentachlorobenzoic acid, pentachlorobenzene, hexachlorobenzene, iodoterephthalic acid, etc.) built up and exceeded their solubility in the spent oleum, they precipitated out with the desired tetrachloroterephthalic acid. Of these contaminants, tetrachlorobenzoic acid and pentachlorobenzoic acid were particularly undesirable since, even in low concentrations, they function as chain stoppers in polyesterification reactions utilizing tetrachloroterephthalic acid derivatives. Pentachlorobenzene and hexachlorobenzene are undesirable since they sublime on drying the product and migrate while the various iodoterephthalic acids are undesirable because of their poor light stability.

The general object of this invention is to provide improved methods of recovering tetrachloroterephthalic acid. Another object of this invention is to provide techniques for utilizing spent oleum containing dissolved chlorinated products in processes for producing tetrachloroterephthalic acid from terephthalic acid. Other objects appear hereinafter.

We have now found that the objects of this invention can be attained by making use of our discovery that the solubility of tetrachloroterephthalic acid in spent oleum can be markedly reduced by eliminating substantially all the sulfur trioxide and chlorosulfonic acid in the mother liquor. At the same time, the solubility characteristics of the various other by-products of the chlorination reaction are not seriously altered. The sulfur trioxide and chlorosulfonic acid can be eliminated by distillation and/or by adding sufficient water to convert these materials to the acids (sulfuric acid and hydrochloric acid). For example, when the mother liquor filtrate from the chlorination of terephthalic acid was diluted with approximately 5 grams water per 100 grams filtrate, a second crop of insoluble tetrachloroterephthalic acid was obtained which constituted about 24% by weight of the total first and second crop insoluble tetrachloroterephthalic acid. The second crop had a purity of 95.3% by weight versus a purity of 98% by weight for the first crop. When sulfur trioxide and chlorosulfonic acid were removed by distillation from a filtrate, a second crop of insoluble tetrachloroterephthalic acid was obtained which constituted about 47% by weight of the total first and second crop insoluble tetrachloroterephthalic acid. The second crop had a purity of 97.6% versus a first crop purity of 98.1%. Accordingly, this invention comprises recovering insoluble tetrachloroterephthalic acid from spent oleum chlorination liquor by eliminating substantially all sulfur trioxide and chlorosulfonic acid from the chlorination liquor and partitioning insoluble tetrachloroterphthalic acid.

As indicated above, the sulfur trioxide and chlorosulfonic acid can be eliminated by distillation or by adding sufficient water to the mother liquor to convert these compounds to the acids (sulfuric acid and hydrochloric acid). The former route is preferred since sulfur trioxide and chlorosulfonic acid have a substantially greater recovered value than sulfuric acid. Further, the tetrachloroterephthalic acid recovered by the first route is of somewhat higher purity than that obtained by destruction of the sulfuric acid precursors.

The tetrachloroterephthalic acid can be obtained in two crops, as indicated above (partitioning the first crop insolubles, eliminating sulfur trioxide and chlorosulfonic acid, followed by partitioning the second crop insolubles) or a single crop can be obtained. In the latter case, sulfur trioxide and chlorosulfonic acid are eliminated before the single partitioning step. The former route is preferred since the first crop insolubles are generally of a somewhat higher purity thereby necessitating less recovery problems. The former route is also preferred since it permits the efficient recycling of fortified mother liquor.

In somewhat greater detail, this invention comprises dissolving from 0.4 to 2.0 parts by weight, preferably 0.8 to 1.2 parts by weight, terephthalic acid in 10 parts by weight oleum to produce a 4 to 17% by weight terephthalic acid solution, preferably 7 to 12% by weight solution. The oleum can contain from 15 to 50% by weight sulfur trioxide. In general, the sulfur trioxide content of the oleum is relatively unimportant provided the mole ratio of sulfur trioxide to terephthalic acid is between 4:1 and 5.5:1, preferably about 4.25:5.25. Other things being equal, yield of tetrachloroterephthalic acid reaches a maximum within the preferred range and falls off rapidly above and below the preferred range.

After a catalyst, preferably iodine in a concentration of about 0.2 to 10 parts by weight per 100 parts by weight terephthalic acid is added, chlorine is bubbled into the reactor while maintaining the reactor at about 60° to 110°C. Although at least 4 moles chlorine per mole terephthalic acid must be added to obtain theoretically complete chlorination of terephthalic acid to tetrachloroterephthalic acid, chlorine addition is preferably continued until there is no further observed weight increase in the reactor. For example, other things being equal, a 2.8% decrease in observed chlorine uptake results in an 11.1 mole percent lower yield of tetrachloroterephthalic acid. This lower yield is consistent with what would be expected from stepwise chlorination.

The chlorination can be carried out at 70° to 110°C., preferably 85° to 95°C. Temperatures over about 110°C. tend to lead to side reactions, particularly iodation of the terephthalic acid and loss of carboxylic acid groups. At above 110°C., sulfur trioxide can also be lost by entrainment in chlorine gas bubbled through the reactor.

Chlorination can be carried out at atmospheric pressure or in pressure vessels. In either case chlorine uptake is rapid.

After the chlorination is completed, the tetrachloroterephthalic acid can be recovered as a single crop of insoluble material or in two crops. In those cases, where the tetrachloroterephthalic acid is to be recovered in a single crop, substantially all the sulfur trioxide and chlorosulfonic acid in the spent oleum chlorination liquor must be eliminated before partitioning. This can be accomplished by distilling off substantially all the sulfur trioxide (B.P. 44.6°C.) and chlorosulfonic acid (B.P. 151°C.). In general, it is preferred to fractionally distill these compounds and recover them for subsequent use. In which case, chlorosulfonic acid is preferably distilled under reduced pressure at about 40° to 90°C. to minimize thermal decomposition of the chlorosulfonic acid and to preserve the quality of the chlorinated terephthalic acid. The residual suspension is then partitioned, preferably after cooling to ambient temperatures (10°-40°C.), by conventional means (filtration, centrifugation) to recover the relatively pure insoluble tetrachloroterephthalic acid.

Alternatively, substantially all the sulfur trioxide and chlorosulfonic acid can be eliminated by adding sufficient water (preferably in a stoichiometric amount based on sulfur trioxide and chlorosulfonic acid) to the spent oleum chlorination liquor to convert the sulfur trioxide and chlorosulfonic acid to the acids. Typically between about 2 to 20 parts by weight water per 100 parts by weight chlorination liquor can be used. In general, it is preferred to add as little water as possible in order to minimize co-precipitation of other contaminants. The mother liquor is then partitioned in the manner described above. It is, of course, within the scope of this invention to distill off only the very low boiling sulfur trioxide followed by converting the chlorosulfonic acid to sulfuric acid and hydrochloric acid with substantially stiochiometric quantities of water.

In those cases, where the tetrachloroterephthalic acid is to be recovered in two crops, the spent oleum chlorination liquor is partitioned, preferably after cooling to ambient temperatures in the manner described above. Substantially all the sulfur trioxide or chlorosulfonic acid remaining in the solute can be eliminated in the manner described above and a second crop of insoluble tetrachloroterephthalic acid recovered by partitioning (filtration or centrifugation). Alternatively, part of the liquor from the first partitioning (e.g., 60 to 90% by weight) can be fortified with fresh sulfur trioxide and oleum for use in the chlorination of another batch of terephthalic acid. The remaining solution (e.g., 10 to 40%) by weight can then be treated to eliminate substantially all sulfur trioxide and chlorosulfonic acid in the manner described above and then partitioned. In this way, one can reuse spent oleum chlorination liquor while minimizing the buildup of contaminants to a tolerable level.

The following examples are merely illustrative.

EXAMPLE I

A 99.8 gram sample of purified terephthalic acid was added to 1,083 grams of 103.5% sulfuric acid in a one-liter, 4-neck, round bottom, creased flask equipped with a stirrer, thermometer (into the liquid), reflux condenser and gas inlet line with a fritted glass sparger. While stirring, the suspension was heated to 74°C. and complete solution resulted. Iodine (1.0 grams) was added to the flask. The apparatus was placed on a scale so that weight uptake could be followed. With strong stirring, chlorine gas was bubbled through the solution at the rate of 1.25 liters per minute for 4 hours. An aluminum foil light shield enclosed the flask during the run. The temperature, 78°C. initially, rose to 87°C. in 25 minutes and was maintained in the 84°-88°C. range. A total of 141 grams increase in weight was noted after 3½ hours and no further increase in weight occurred in the last ½ hour. The solution deposited a solid product toward the end of the chlorination. After standing overnight at room temperature, the suspension was filtered on an M porosity, fritted-glass Buchner funnel. The oleum mother liquor (1,135.2 grams) was saved in a sealed container. The first crop wet cake was suspended in 300 ml of distilled water, heated to 80°C. for 30 minutes on the steam cone, then cooled to room temperature with stirring in an ice bath. The suspension was filtered through an M Buchner funnel, and the cake was washed on the filter with 100 ml 10% hydrochloric acid and finally with 50 ml of distilled water. The filter cake was dried 3½ days at 50°C. in a vacuum oven, after which it weighed 115.6 grams.

A 100.9 gram aliquot of the oleum mother liquor was stirred in a 125 ml Erlenmeyer flask. Five ml of water were dripped in very slowly from a burette into the vigorously stirring solution. The suspension resulting was digested on the steam cone, cooled in an ice bath and filtered. The second crop cake was washed with 20 ml 10% HCl followed by distilled water. It was dried 3 days at 50°C. in the vacuum oven, following which it weighed 3.3 grams. If all of the mother liquor had been treated in this manner, the second crop of tetrachloroterephthalic acid would have constituted 24% by weight of the tetrachloroterephthalic acid obtainable from the 2 crops of tetrachloroterephthalic acid. The first crop had a purity of 98% while the second crop had a purity of 95.3%.

EXAMPLE II

This example illustrates the production of a second crop of tetrachloroterephthalic acid by distilling off sulfur trioxide and chlorosulfonic acid from the mother liquor solute. Ninety and eight-tenth (90.8) grams of terephthalic acid in 1102.4 grams oleum (19.7% $SO_3$) was chlorinated by the method of Example I using 1.0 grams iodine and a reaction temperature of 80°–91°C. for 5 hours. Sixty-nine and two-tenths (69.2) grams of 98.1% pure tetrachloroterephthalic acid was obtained as a first crop by the isolation technique of Example I. Two hundred sixty-six (266) grams chlorosulfonic acid and sulfur trioxide were distilled from the solution at a head temperature of 68° to 84°C. at 10–25 mm of Hg. After cooling, 61.6 g of tetrachloroterephthalic acid was filtered off, washed and dried. This second crop constituted 47% by weight of the total first and second crop tetrachloroterephthalic acid. The second crop had a 97.6% purity.

EXAMPLE III

This example illustrates that if excess water is used to eliminate chlorosulfonic acid and sulfur trioxide from the mother liquor solute, the tetrachloroterephthalic acid has reduced purity. One hundred gram portions of mother liquor were diluted with water and the insolubles partitioned and recovered in the manner described above. The organic acids in the insoluble portion were esterified with diazomethane and the products analyzed by gas chromatography. The results are set forth below in Table I.

TABLE I

|  | Run I | Run II | Run III |
|---|---|---|---|
| Grams Water Added | 5.0 | 9.7 | 14.7 |
| Grams of Solids Partitioned | 3.3 | 3.6 | 4.8 |
| Total Solids in 100 grams Mother Liquor | 4.8 | 4.8 | 4.8 |
| Purity of Tetrachloroterephthalic Acid Recovered | 95.3% | 94.4% | 77.5% |

The above data indicates that as the amount of water used to eliminate chlorosulfonic acid and sulfur trioxide increases, the purity of the recovered tetrachloroterephthalic acid decreases.

We claim:

1. An improved method of isolating relatively pure tetrachloroterephthalic acid from a spent oleum chlorination mother liquor which comprises the steps of eliminating substantially all sulfur trioxide and chlorosulfonic acid from said mother liquor and partitioning tetrachloroterephthalic acid from the mother liquor, wherein said sulfur trioxide and chlorosulfonic acid are eliminated by (1) distilling off both compounds, or (2) by converting said compounds to the acids by reacting substantially stoichiometric amounts of water with said mother liquor or (3) distilling off said sulfur trioxide followed by reacting substantially stoichiometric amounts of water with said mother liquor to convert said chlorosulfonic acid to sulfuric acid and hydrochloric acid.

2. The method of claim 1, wherein said sulfur trioxide and chlorosulfonic acid are both eliminated by distilling off said compounds.

3. The method of claim 1, wherein said sulfur trioxide and chlorosulfonic acid are eliminated by converting said compounds to the acids by adding substantially stoichiometric amounts of water to said mother liquor.

4. The method of claim 1 wherein said sulfur trioxide and chlorosulfonic acid are eliminated by distilling off said sulfur trioxide followed by adding substantially stoichiometric amounts of water to convert said chlorosulfonic acid to sulfuric acid and hydrochloric acid.

5. The method of claim 1 wherein said sulfur trioxide and chlorosulfonic acid are eliminated after the first crop of tetrachloroterephthalic acid has been partitioned from said spent oleum chlorination liquor.

6. The method of claim 1 wherein said sulfur trioxide and chlorosulfonic acid are eliminated before the first crop of tetrachloroterephthalic acid has been partitioned from said spent oleum chlorination liquor.

7. An improved method of isolating relatively pure tetrachloroterephthalic acid from a spent oleum chlorination mother liquor which comprises the steps of partitioning the first crop of insoluble tetrachloroterephthalic acid from said chlorination liquor, eliminating substantially all sulfur trioxide and chlorosulfonic acid from said mother liquor and partitioning a second crop of insoluble tetrachloroterephthalic acid from the mother liquor, wherein said sulfur trioxide and chlorosulfonic acid are eliminated by (1) distilling off both compounds, or (2) by converting said compounds to the acids by reacting substantially stoichiometric amounts of water with said mother liquor or (3) distilling off said sulfur trioxide followed by reacting substantially stoichiometric amounts of water with said mother liquor to convert said chlorosulfonic acid to sulfuric acid and hydrochloric acid.

8. The method of claim 7, wherein said sulfur trioxide and chlorosulfonic acid are both eliminated by distilling off said compounds.

9. The method of claim 7, wherein said sulfur trioxide and chlorosulfonic acid are eliminated by converting said compounds to the acid by adding substantially stoichiometric amounts of water to said mother liquor.

10. The method of claim 7, wherein said sulfur trioxide and chlorosulfonic acid are eliminated by distilling off said sulfur trioxide followed by adding substantially stoichiometric amounts of water to convert said chlorosulfonic acid to sulfuric acid and hydrochloric acid.

* * * * *